United States Patent
Borikar

(10) Patent No.: US 10,872,056 B2
(45) Date of Patent: Dec. 22, 2020

(54) REMOTE MEMORY ACCESS USING MEMORY MAPPED ADDRESSING AMONG MULTIPLE COMPUTE NODES

(71) Applicant: Cisco Technology, Inc., San Jose, CA (US)

(72) Inventor: Sagar Borikar, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/542,952

(22) Filed: Aug. 16, 2019

(65) Prior Publication Data
US 2019/0370216 A1 Dec. 5, 2019

Related U.S. Application Data

(62) Division of application No. 15/174,718, filed on Jun. 6, 2016, now abandoned.

(51) Int. Cl.
*G06F 15/173* (2006.01)
*H04L 29/08* (2006.01)
(Continued)

(52) U.S. Cl.
CPC .... *G06F 15/17331* (2013.01); *G06F 13/4282* (2013.01); *H04L 67/1097* (2013.01); *H04L 67/40* (2013.01)

(58) Field of Classification Search
CPC ........... G06F 15/17331; G06F 13/4282; G06F 15/17306; H04L 67/40; H04L 67/1097
See application file for complete search history.

(56) References Cited

U.S. PATENT DOCUMENTS

| 4,688,695 A | 8/1987 | Hirohata |
| 5,263,003 A | 11/1993 | Cowles et al. |

(Continued)

FOREIGN PATENT DOCUMENTS

| EP | 2228719 | 9/2010 |
| EP | 2439637 | 4/2012 |

(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.

(Continued)

*Primary Examiner* — Umar Cheema
*Assistant Examiner* — James Ross Hollister
(74) *Attorney, Agent, or Firm* — Polsinelli PC

(57) ABSTRACT

An example method for facilitating remote memory access with memory mapped addressing among multiple compute nodes is executed at an input/output (IO) adapter in communication with the compute nodes over a Peripheral Component Interconnect Express (PCIE) bus, the method including: receiving a memory request from a first compute node to permit access by a second compute node to a local memory region of the first compute node; generating a remap window region in a memory element of the IO adapter, the remap window region corresponding to a base address register (BAR) of the second compute node; and configuring the remap window region to point to the local memory region of the first compute node, wherein access by the second compute node to the BAR corresponding with the remap window region results in direct access of the local memory region of the first compute node by the second compute node.

20 Claims, 9 Drawing Sheets

(51) Int. Cl.
*G06F 13/42* (2006.01)
*H04L 29/06* (2006.01)

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |

(56) References Cited

U.S. PATENT DOCUMENTS

| | | |
|---|---|---|
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |

(56) References Cited

U.S. PATENT DOCUMENTS

| | | |
|---|---|---|
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1* | 11/2008 | Galles .................. G06F 13/10 710/3 |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |

(56) References Cited

U.S. PATENT DOCUMENTS

| | | |
|---|---|---|
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yang |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1* | 7/2014 | Peng ............... G06F 12/0223 711/170 |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0120969 A1* | 4/2015 | He ..................... G06F 3/0611 710/74 |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263887 A1* | 9/2015 | Sajeepa ............... H04L 41/0803 709/220 |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0098358 A1* | 4/2016 | Cha ..................... G06F 12/1081 710/313 |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0139799 A1* | 5/2017 | Puri ..................... G06F 13/4282 |
| 2017/0168970 A1 | 6/2017 | Sajeepa et al. |
| 2017/0177471 A1* | 6/2017 | Berman ............... G06F 3/0656 |
| 2017/0177860 A1 | 6/2017 | Suarez et al. |
| 2017/0199768 A1* | 7/2017 | Arroyo ............... G06F 13/4282 |
| 2017/0212858 A1 | 7/2017 | Chu et al. |
| 2017/0273019 A1 | 9/2017 | Park et al. |
| 2017/0277655 A1* | 9/2017 | Das ..................... G06F 3/0653 |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |
| 2018/0225254 A1* | 8/2018 | Hu ..................... G06F 9/45558 |

FOREIGN PATENT DOCUMENTS

| | | |
|---|---|---|
| EP | 2680155 A1 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

(56) References Cited

OTHER PUBLICATIONS

Author Unknown, "Data Center, Metro Cloud Connectivity: Integrated Metro SAN Connectivity in 16 Gbps Switches," Brocade Communication Systems, Inc., Apr. 2011, 14 pages.
Author Unknown, "Data Center, SAN Fabric Administration Best Practices Guide, Support Perspective," Brocade Communication Systems, Inc., May 2013, 21 pages.
Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.
Author Unknown, "EMC Unisphere: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer, Enabling Confidence in Application Performance Before Deployment," 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks An Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Infrastructure for the Cloud," Solution Brief, © 2012, 3 pages; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "Vblock Solution for SAP: Simplified Provisioning for Operation Efficiency," VCE White Paper, VCE—The Virtual Computing Environment Company, Aug. 2011, 11 pages.
Aweya, James, et al., "Multi-level active queue management with dynamic thresholds," Elsevier, Computer Communications 25 (2002) pp. 756-771.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel-Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," 13$^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage in VMware vSph ere Environments," Version 8.0, EMC$^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.

(56) References Cited

OTHER PUBLICATIONS

Lin, Jessica, "Finding Motifs in Time Series," SIGKDD'02 Jul. 23-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, Ao, et al., "RAIDShield: Characterizing, Monitoring, and Proactively Protecting Against Disk Failures," FAST '15, 13$^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Petersen, Chris, "Introducing Lightning: A flexible NVMe JBOF," Mar. 9, 2016, 6 pages.
Pinheiro, Eduardo, et al., "Failure Trends in a Large Disk Drive Population," FAST '07, 5$^{th}$ USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: 5$^{th}$ USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, 10$^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Stamey, John, et al., "Client-Side Dynamic Metadata in Web 2.0," SIGDOC '07, Oct. 22-24, 2007, pp. 155-161.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "Ceph: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," Ceph, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology Of China, 2012, 12 pages.

* cited by examiner

US 10,872,056 B2

REMOTE MEMORY ACCESS USING MEMORY MAPPED ADDRESSING AMONG MULTIPLE COMPUTE NODES

CROSS-REFERENCE TO RELATED APPLICATION

The instant application is a Divisional of and claims priority to U.S. patent application Ser. No. 15/174,718 entitled REMOTE MEMORY ACCESS USING MEMORY MAPPED ADDRESSING AMONG MULTIPLE COMPUTE NODES filed Jun. 6, 2016, the contents of which are expressly incorporated by reference herein in its entirety.

TECHNICAL FIELD

This disclosure relates in general to the field of communications and, more particularly, to remote memory access with memory mapped addressing among multiple compute nodes.

BACKGROUND

Compute nodes such as microservers and hypervisor-based virtual machines executing in a single chassis can provide scaled out workloads in hyper-scale data centers. Microservers are an emerging trend of servers for processing lightweight workloads with large numbers (e.g., tens or even hundreds) of relatively lightweight server nodes bundled together in a shared chassis infrastructure, for example, sharing power, cooling fans, and input/output components, eliminating space and power consumption demands of duplicate infrastructure components. The microserver topology facilitates density, lower power per node, reduced costs, and increased operational efficiency. Microservers are generally based on small form-factor, system-on-a-chip (SoC) boards, which pack processing capability, memory, and system input/output onto a single integrated circuit. Unlike the relatively newer microservers, hypervisor-based virtual machines have been in use for several years. Yet, sharing data across the compute nodes with more effective and efficient inter-process communication has always been a challenge.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating remote memory access with memory mapped addressing among multiple compute nodes is executed at an input/output (IO) adapter in communication with the compute nodes over a Peripheral Component Interconnect Express (PCIE) bus, the method including: receiving a memory request from a first compute node to permit access by a second compute node to a local memory region of the first compute node; generating a remap window region in a memory element of the IO adapter, the remap window region corresponding to a base address register (BAR) of the second compute node in the 10 adapter; and configuring the remap window region to point to the local memory region of the first compute node, wherein access by the second compute node to the BAR corresponding with the remap window region results in direct access of the local memory region of the first compute node by the second compute node. As used herein, the term "compute node" refers to a hardware processing apparatus, in which user applications (e.g., software programs) are executed.

Example Embodiments

Figure 1:
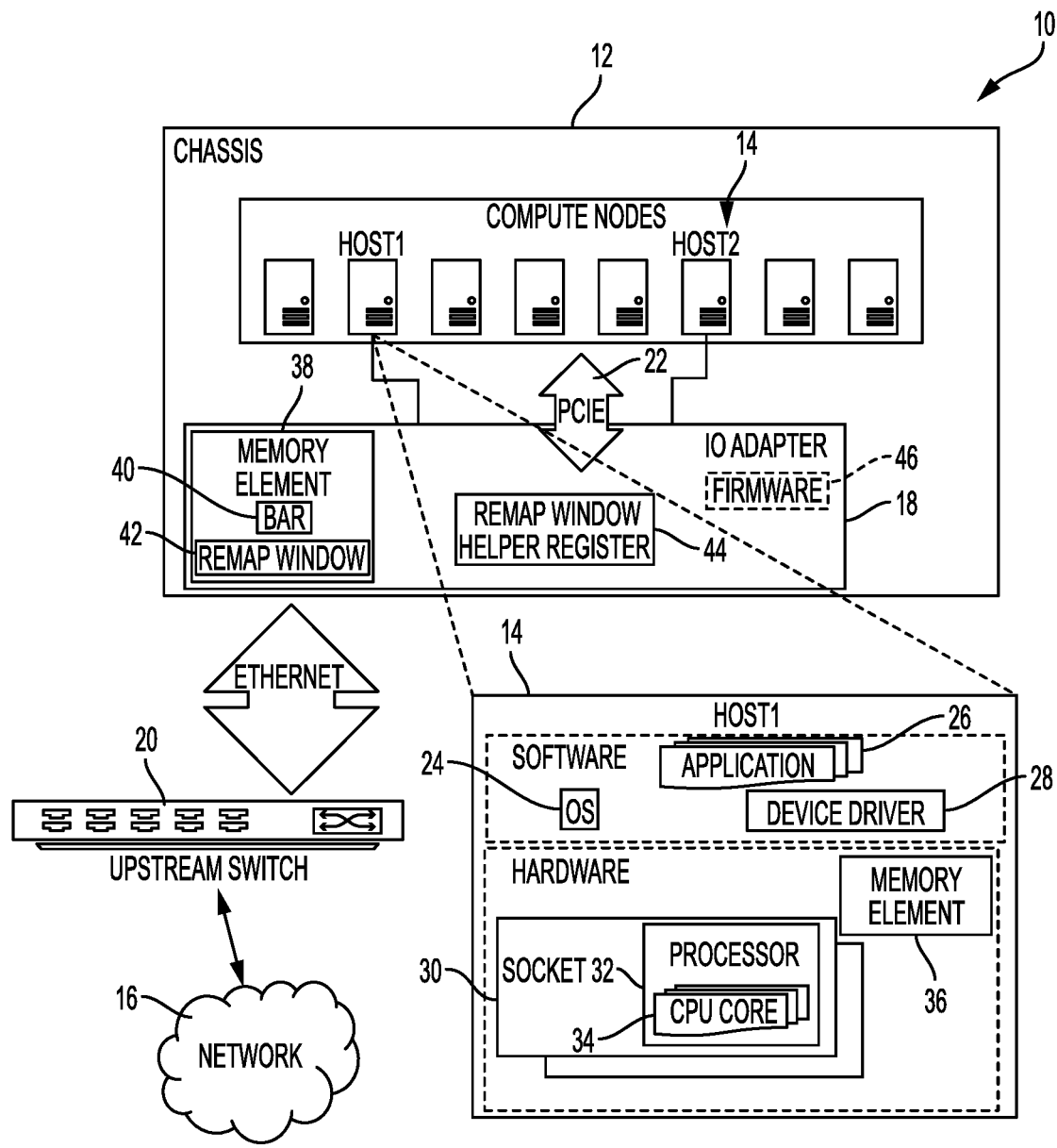
FIG. 1 is a simplified block diagram illustrating a communication system for facilitating remote memory access with memory mapped addressing among multiple compute nodes.

Turning to FIG. 1, FIG. 1 is a simplified block diagram illustrating a communication system 10 for facilitating remote memory access with memory mapped addressing among multiple compute nodes in accordance with one example embodiment. FIG. 1 illustrates a communication system 10 comprising a chassis 12, which includes a plurality of compute nodes 14 that communicate with network 16 through a common input/output (110) adapter 18. An upstream switch 20 facilitates north-south traffic between compute nodes 14 and network 16. Shared IO adapter 18 presents network and storage devices on a Peripheral Component Interconnect Express (PCIE) bus 22 to compute nodes 14. In various embodiments, each compute node appears as a PCIE device to other compute nodes in chassis 12.

In a general sense, compute nodes 14 include capabilities for processing, memory, network and storage resources. For example, as shown in greater detail in the figure, compute node Host1 runs (e.g., executes) an operating system 24 and various applications 26. A device driver (also referred to herein as a driver) 28 operates or controls a particular type of device that is attached to compute node 14. For example, each PCIE device visible to (e.g., accessible by) Host1 may be associated with a separate device driver in some embodiments. In another example, all PCIE endpoints visible to Host1 may be associated with a single PCIE device driver.

In a general sense device driver 28 provides a software interface to hardware devices, enabling operating system 24 and applications 26 to access hardware functions (e.g., memory access) without needing to know precise details of the hardware being used.

In many embodiments, substantially all PCIE endpoints appear as hardware device to the accessing compute node, irrespective of its actual form. For example, in some embodiments, compute nodes 14 may comprise virtual machines; however, because one compute node is visible as a PCIE device to another compute node, they appear as hardware devices to each other and are associated with corresponding device drivers. Driver 28 communicates with the hardware device through PCIE bus 22. When one of applications 26 invokes a routine in driver 28, driver 28 issues commands to the hardware device it is associated with. Thus, driver 28 facilitates communication (e.g., acts as a translator) between its associated hardware device and applications 26. Driver 28 is hardware dependent and operating-system-specific.

In various embodiments, each of compute nodes 14, as shown using example Host1, includes various hardware components, such as one or more sockets 30 (e.g., socket refers to a hardware receptacle that enables a collection of central processing unit (CPU) cores with a direct pipe to memory); each socket holds one processor 32; each processor comprises one or more CPU cores 34; each CPU core 34 executes instructions (e.g., computations, such as Floating-point Operations Per Second (FLOPS)); a memory element 36 may facilitate operations of CPU cores 34.

Common IO adapter 18 facilitates communication to and from each of compute nodes 14. In various embodiments, IO adapter 18 services both network and storage access requests from compute nodes 14 in chassis 12, facilitating a cost efficient architecture. In various embodiments, a memory element 38 may be associated with (e.g., accessed by) IP adapter 18. Memory element 38 includes various base address registers (BARs) 40 and remap windows 42 for various operations as described herein. A remap window helper register 44 and firmware 46 are also included (among other components) in IO adapter 18. As used herein the term "firmware" comprises machine-readable and executable instructions and associated data that are stored in (e.g., embedded in, forming an integral part of, etc.) hardware, such as a read-only memory, or flash memory, or an ASIC, or a field programmable gate array (FPGA) and executed by one or more processors (not shown) in IO adapter 18 to control the operations of IO adapter 18. In a general sense, firmware 46 comprises a combination of software and hardware used exclusively to control operations of IO adapter 18.

In a general sense, network traffic between compute nodes 14 and network 16 may be termed as "North-South Traffic"; network traffic among compute nodes 14 may be termed as "East-West Traffic". Note that compute nodes 14 are unaware of the physical location of other compute nodes, for example, whether they exist in same chassis 12, or are located remotely, over network 16. Thus, compute nodes 14 are agnostic to the direction of network traffic they originate or terminate, such as whether the traffic is North-South, or East-West, and thereby use the same addressing mechanism (e.g., L2 Ethernet MAC address/IP address) for addressing nodes located in same chassis 12 or located in a remote node in same L2/L3 domain.

According to various embodiments of communication system 10, a memory access scheme using low latency and low overhead protocols implemented in IO adapter 18 allows any one (or more) compute nodes 14, for example, Host1, to share and access remote memory of another compute node (e.g., across different servers; across a hypervisor; across different operating systems), for example, Host2. Host2 may include an operating system different from that of Host1 without departing from the scope of the embodiments. The protocols as described herein do not require any particularized (e.g., custom) support from the operating systems or networking stack of Host1 or Host2. The scheme is completely transparent to the operating systems of Host1 and Host2, allowing suitable throughput while communicating in different memory domains.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In any server ecosystem, typical challenges to achieving better inter-process communication or sharing the data across the servers include reliable tunnels for the data sharing, low latency for the communication, low overhead while working with remote server etc. There are several solutions available in the market that predominantly use network tunnels to communicate in two distinct physical servers. Typical examples would be Remote Direct Memory Access (RDMA), RDMA over Converged Ethernet (RoCE) and InfiniBand. Although proven and in use for several years, such network based communication can be limited by various parameters, such as latency, networking stack dependency (e.g., network stack awareness), OS interference (e.g., OS dependency, OS awareness, OS configuration), IO semantics and key exchanges for security, necessity for protocol awareness, complex channel semantics and tedious channel setup procedures. Moreover, not all operating systems support RDMA (and its variants).

For example, RDMA communication is based on a set of three queues: (i) a send queue and (ii) a receive queue, comprising a Queue Pair (QP) and (iii) a Completion Queue (CQ). Posts in the QP are used to initiate the sending or receiving of data. A sending application (e.g., driver) places instructions, called Work Queue Elements (WQE), on its work queues that generate buffers in the sender's adapter to send data. The WQE placed on the send queue contains a pointer to the message to be sent; a pointer in the WQE on the receive queue contains a pointer to a buffer where an incoming message can be placed. The sender's adapter consumes WQE from the send queue at the egress side and streams the data from the memory region to the remote receiver. When data arrives at the remote receiver, the receiver's adapter consumes the WQEs at the receive queue at the ingress side and places the received data in appropriate memory regions of the receiving application. Any memory sharing or access between a sending compute node and the receiving compute node thus requires tedious channel setup, RDMA protocols, etc.

Moreover, in a chassis where several compute nodes share a common IO adapter, such remote memory access sharing protocols can have unnecessary overhead. For example, every packet from any compute node, say Host1, has to hit a port of upstream switch 20 and then return on the same pipe back to IO adapter 18, which then redirects it to the destination compute node, say Host2. Such east-west data sharing can cause inefficient utilization of bandwidth in the common pipe, which is potentially used by various other compute nodes performing extensive north-south traffic with network 16. The east-west traffic pattern also increases application response latency, for example, due to longer path to be traversed by network packets.

Communication system 10 is configured to address these issues (among others) to offer a system and method for facilitating remote memory access with memory mapped addressing among multiple compute nodes 14 sharing IO adapter 18. In various embodiments, PCIE, which is typically supported by almost all operating systems, is used to share data from a memory region on one compute node, say Host1, with a different memory region of another compute node, say Host2. As used herein, the term "memory region" comprises a block (e.g., section, portion, slice, chunk, piece, space, etc.) of memory that can be accessed through a contiguous range of memory addresses (e.g., a memory address is a unique identifier (e.g., binary identifier) used by a processor for tracking a location of each memory byte stored in the memory). As used herein, the term "window" in the context of memory regions refers to a memory region comprising a contiguous range of memory addresses, either virtual or physical.

In various embodiments, IO adapter 18 is connected to compute nodes 14 by means of PCIE bus 22. IO adapter 18 includes an embedded operating system hosting multiple VNICs configured with memory resources of memory element 38. Each VNIC accesses a separate, exclusive region of memory element 38. Each PCIE endpoint, namely VNICs is typically associated with a host software driver, namely device driver 28. In an example embodiment, each VNIC that requires a separate driver is considered a separate PCIE device.

For ease of explanation of various embodiments, a brief overview of PCIE protocol is provided herein. A PCIe data transfer subsystem in a computing system (such as that of an IO adapter) includes a PCIe root complex comprising a computer hardware chipset that handles communications between the PCIE endpoints. The root complex enables PCIe endpoints to be discovered, enumerated and worked upon by the host operating system. The base PCIe switching structure of a single root complex has a tree topology, which addresses PCIe endpoints through a bus numbering scheme. Configuration software on the root complex detects every bus, device and function (e.g., storage adapter, networking adapter, graphics adapter, hard drive interface, device controller, Ethernet controller, etc.) within a given PCIe topology.

The IO adapter's operating system assigns address space in the IO adapter memory element 38 to each PCIe endpoint (e.g., VNIC) so that the PCIe endpoint can understand at what address space it is identified by the IO adapter and map the corresponding interrupts accordingly. After the configuration of the PCIe endpoint device is complete, the PCIe's device driver 28 compatible with the host operating system 24 can work efficiently with the PCIe endpoint and facilitate appropriate device specific functionality.

Each PCIE endpoint is enabled on IO adapter 18 by being mapped into a memory-mapped address space in memory element 18 referred to as configuration space (e.g., register, typically consisting of 256 bytes). The configuration space contains a number of base address registers (BARs) 40, comprising the starting address of a contiguous mapped address in IO adapter memory element 38. For example, a 32-bit BAR0 is offset 10 h in PCI Compatible Configuration Space—and post enumeration would contain the start address of BAR. Any other PCIE endpoint, to access (e.g., read data from or write data to) the PCIE endpoint associated with a specific BAR, would submit a request with the address of that BAR. An enumeration software allocates memory for the PCIE endpoints and writes to corresponding BARs. Firmware 46 programs the PCIe endpoint's BARs to inform the PCIe endpoints of its address mapping. When the BAR for a particular PCIe endpoint is written, all memory transactions generated to that bus address range are claimed by the particular PCIe endpoint.

Typically, when a PCIE endpoint, say a flash memory device, is discovered on one of the compute nodes, say, Host1, OS 24 provides a physical address to BAR 40 and allocates the address space for device driver 28 to interact with the flash memory device. When device driver 28 is loaded, it requests the memory mapped address from OS 24 corresponding to the physical address so that it can work with the flash memory device using the address handle. Subsequent accesses to BAR 40 from device driver 28 are completely transparent to OS 24 as it has already carved out the address space sufficient to work with the flash memory device. Thus, typical PCIE data access is between application 26 and the PCIE endpoint, such as the flash memory device. PCIE data access is not typically used across two different compute nodes 14. In other words, one compute node typically cannot share its memory space with another compute node using native PCIE protocols.

Nevertheless, according to various embodiments, appropriate configuration of IO adapter 18 with multiple ports and remap window feature can support memory sharing between compute nodes 14 using PCIE. Remap window feature includes a remap window base and remap window region for memory mapping for the purpose of remapping root complex IO and memory BARs to address ranges that are directly addressable by the processor. Remap window base is used to configure a start address of a memory region which can be mapped to any other memory region. The remap window region refers to the mapped region in memory element 38 differentiated according to a virtual network interface card (VNIC) identifier (ID) configured in remap window helper register 44 in IO adapter 18.

The VNIC ID could map to any host-based VNIC or root complex VNIC. In some embodiments, four remap window regions, each capable of addressing 4 MB may be allocated for the remap window feature, permitting easy access of up to 16 MB of memory either in host memory or Root Complex endpoint device memory. Moreover, multiple PCIE ports on PCIE bus 22 distinguish different PCIE lanes associated with distinct compute nodes 14. Each memory region in Root Complex endpoint device memory is associated with a distinct PCIE lane that is completely independent of each other such that no two memory regions share any PCIE activity with each other.

In an example embodiment, an administrator configures the VNIC ID of computing nodes 14 through respective service profiles. A unified computing system manager (e.g., network management application such as Cisco® UCSM) programs the VNIC ID in IO adapter 18 through appropriate control management protocol. Upon reception, firmware 46 populates the VNIC ID information in remap window helper register 44 and also makes the VNICs ready and discoverable from corresponding computing nodes 14. Firmware 46 adds the BAR size of a specific BAR, for example, BAR3, to the memory region allocated with each VNIC ID. In an example embodiment, 16 MB may be added to accommodate all four remap window regions.

After one of computing nodes 14, say Host1 is powered up, the enumeration software (BIOS) of IO adapter 18 discovers the new PCIE device. Through PCI enumeration protocol, the BIOS identifies BAR size requirements, and associates a physical address to corresponding Host1 in BAR 40. In various embodiments, three separate BARs are provided for each VNIC, namely, BAR0, BAR1 and BAR2. Device driver 28 upon loading in Host1 requests OS 24 to provide memory mapped equivalent of the physical address for each BAR. It identifies that BAR2 is the remap window region according to a preconfigured protocol between firmware 46 and driver 28. The memory mapped 10 address comprises an address handle given by OS 24 to access the BAR2 region of memory element 38 in IO adapter 18. Applications 26 using device driver 28 understands the capability of remap window exposed by device driver 28. Similar sequence of events occurs in another compute node, say Host2, when it powers up and its device driver is loaded in its OS. Through a pre-determined protocol, applications 26 in compute nodes 14, say Host1 and Host2, exchange their respective address handles through firmware 46 and request corresponding memory access.

The memory access mechanisms described herein can present one of the lowest latency protocols to communicate with different servers, virtual machines, or other such compute nodes 14. In some embodiments, the memory access mechanisms described herein can also be used as IPC between two compute nodes 14. Note that the operating system or network stacks do not need any separate, or distinct configuration to enable such remote memory access. In some embodiments, IO adapter 18 servicing a hypervisor can use the described mechanisms to allow various applications executing in separate virtual machines (e.g., guest domains) to communicate with each other without having to go through specially installed IPC software (e.g., VMWARE ESX/ESXi) or other external memory management/sharing applications.

In an example embodiment wherein compute nodes 14 comprise microservers the storage and network is shared across multiple servers (e.g., in some cases sixteen servers). The network ecosystem (e.g., of network 16) may support different classes and QoS policies for network traffic, which can result in different priority flows. However, storage traffic does not typically have any associated QoS. Such differentiated traffic types (e.g., some traffic having QoS, other traffic not having QoS) can create imbalance of traffic performance across different servers causing some servers using (or allocated) larger bandwidths and other servers using (or allocated) poor bandwidth. With large amounts of input/output among (or from/to) servers, the condition can become worse with performance drops becoming noticeable in some servers. In other words, performance of some servers drops when other unrelated servers are experiencing heavy network traffic.

To have balanced throughput across the servers, a cooperative I/O scheduling across the servers may be implemented. For example, every server monitors and records a number of IO requests issued to IO adapter 18. Such IO statistics are shared with other servers through the local memory mapped scheme in BAR3 as described herein. Such data sharing can facilitate decisions at the individual servers regarding whether to send a SCSI BUSY message to its OS storage stack. Thus, even though the associated storage VNIC has bandwidth to push the IOs to IO adapter 18, it will not schedule the IO requests, voluntarily relinquishing claim on storage for some time, until the network traffic bottleneck clears up. Such actions can lead to other VNICs balancing out storage traffic pattern in chassis 12, maintaining the IO equilibrium therein.

In various embodiments, IO adapter 18 receives a memory request from one of compute nodes 14, say Host1, to permit access by another of compute nodes 14, say Host2, to a local memory region of Host1 (assume the local memory region is in memory element 36). The memory request comprises a host identifier of Host2 and address of the local memory region of Host1 in some embodiments. The host identifier can be obtained from a resource map providing identifying information of compute nodes 14 in communication with IO adapter 18 over PCIE bus 22.

Firmware 46 in IO adapter 18 generates remap window region 42 in memory element 38 of IO adapter 18, remap window region 42 corresponding to BAR 40 (e.g., BAR2) of Host2 in IO adapter 18. Firmware 46 configures remap window region 42 to point to the local memory region of Host1, access by Host2 to BAR2 corresponding with remap window region 42 resulting in direct access of the local memory region of Host1 by Host2. Note that compute nodes 14 are associated with unique PCIE endpoints on PCIE bus 22; therefore, each has distinct BARs 40 associated therewith. Moreover, the direct access of the local memory region of Host1 by Host2 does not involve operating systems of Host1 and/or Host2. BAR2 associated with remap window region 42 can comprise one of a plurality of BARs associated with Host2.

In various embodiments, device driver 28 of Host2 associates BAR2 with remap window region, such that application 26 executing in Host2 can access the local memory region of Host1 through appropriate access requests to BAR2 using device driver 28. In various embodiments, configuring remap window region 42 comprises configuring a remap window base in a BAR Resource Table (BRT) to be a start address of the local memory region.

Turning to the infrastructure of communication system 10, network topology of the network including chassis 12 can include any number of compute nodes, servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, PCIE, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, chassis 12 may comprise a rack-mounted enclosure, blade enclosure, or a rack computer that accepts plug-in compute nodes 14. Note that chassis 12 can include, in a general sense, any suitable network element, which encompasses computers, network appliances, servers, routers, switches, gateways, bridges, load-balancers, firewalls, processors, modules, or any other suitable device, component, element, or object operable to exchange information in a network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

Compute nodes 14 may comprise printed circuit boards, for example, manufactured with empty sockets. Each printed circuit board may hold more than one processor (e.g., within the same processor family, differing core counts, with a wide range of frequencies and vastly differing memory cache structures may be included in a single processor/socket combination). In some embodiments, compute nodes 14 may include hypervisors and virtual machines. IO adapter 18 may include an electronic circuit, expansion card or plug-in module that accepts input and generates output in a particular format. IO adapter 18 facilitates conversion of data format and electronic timing between input/output streams and internal computer circuits of chassis 12. In some embodiments, IO adapter 18 may comprise a hypervisor, and compute nodes 14 may comprise separate virtual machines.

Figure 2:
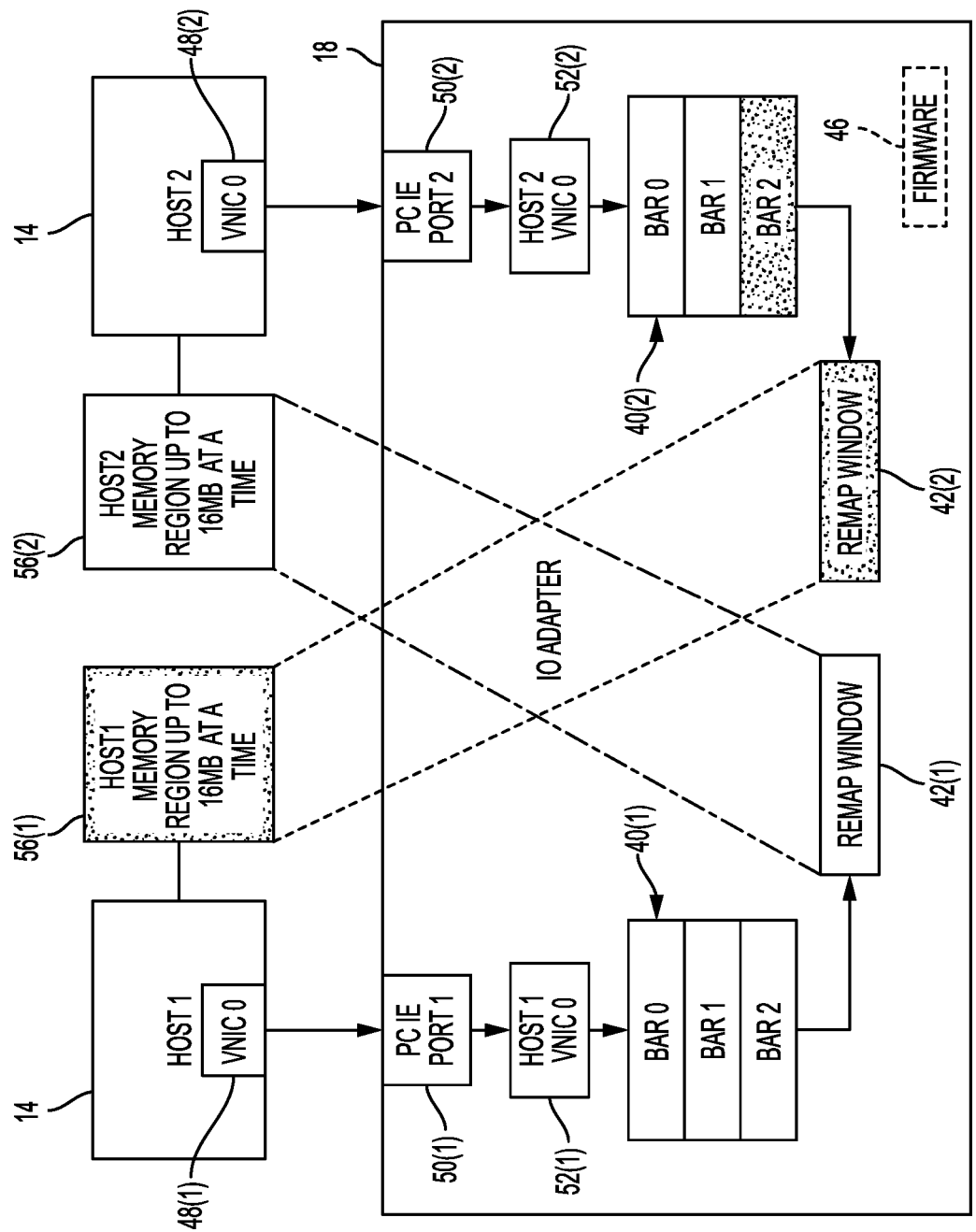
FIG. 2 is a simplified block diagram illustrating other example details of embodiments of the communication system.

Turning to FIG. 2, FIG. 2 is a simplified block diagram illustrating example details according to an embodiment of communication system 10. Assume, merely for example purposes and not as a limitation that computing nodes 14, namely Host1 and Host 2 respectively, are to share data across memory regions according to embodiments of communication system 10. Each compute node 14, namely Host1 and Host2 connects to IO adapter 18 through a respective virtual network interface card (VNIC) 48(1) and 48(2) at the compute node side and a respective PCIE port 50(1) and 50(2) at the IO adapter side. Firmware 46 exposes (e.g., creates, generates, provides, etc.) a separate VNIC 52(1) and 52(2) for corresponding PCIE ports 50(1) and 50(2). VNIC 52(1) and 52(2) at IO adapter 18 act as standalone Ethernet network controller adapters for network traffic and/or as storage controller adapters for storage traffic from and to respective compute nodes 14(1) and 14(2). For example, all traffic from VNIC 48(1) on Host1 is sent to corresponding PCIE port 50(1), through VNIC 52(1), to the external facing port, if needed. VNICs 48(1), 48(2), 52(1) and 52(2) are created based on user configurations, for example, as specified in a service profile and policy configured at the UCSM and deployed therefrom. Each VNIC 52(1) and 52(2) at IO adapter 18 is associated with BAR 40(1) and 40(2) respectively, each comprising three separate memory spaces denoted as: BAR0, BAR1 and BAR2. BARs 40(1) and 40(2) predominantly expose hardware functionality, such as memory spaces that can be used by host software, such as applications 26, to work with VNIC 52(1) and 52(2).

To explain further, consider Host1. Note that the descriptions herein for Host1 apply equally for Host2. Operating system 24 in Host1 enumerates BARs 40(1) associated with Host1 and maps IO address space in host memory 36 to each BAR such that any access to the corresponding mapped addresses in the mapped IO address space in Host1 will point to (e.g., correspond with, associate with) the appropriate one of BARs 40(1): BAR0, BAR1 and BAR2 in IO adapter 18. Note that whereas mapped addresses in Host1 may be virtual, they point to the physical memory region in IO adapter 18. Device driver 28 accesses BARs 40(1) using the memory mapped addresses returned by OS 24.

In various embodiments, BAR2 is reserved for remap window 42, which is identified by the device driver in respective compute nodes 14. For example, BAR2 of BAR 40(1) is reserved for remap window region 42(1) and BAR2 of BAR 40(2) is reserved for remap window region 42(2). In other words, device driver 28 in Host1 understands BAR2 of 40(1) to be associated with remap window 42(1). When device driver 28 (or application 26) in Host1 wants to allow another compute node, such as Host2, to access its local memory 56(1), firmware 46 configures remap window 42(2) of Host2 to point to memory addressed space 56(1) of Host1. Similarly, when device driver 28 (or application 26) in Host2 wants to allow Host1 to access its local memory 56(2), firmware 46 configures remap window 42(1) to point to memory addressed space 56(2) of Host2.

In other words, BAR2 of BAR 40(1) associated with Host1 refers to memory space 56(2) of Host2; likewise, BAR2 of BAR 40(2) associated with Host2 refers to memory space 56(1) of Host1. Anything written to BAR2 of BAR 40(1) by Host1 will be as if written directly into memory space 56(2) of Host2, without any intervening protocols or communication. Thus applications in separate compute nodes can easily access the memory present in their peer's memory domain.

Figure 3:
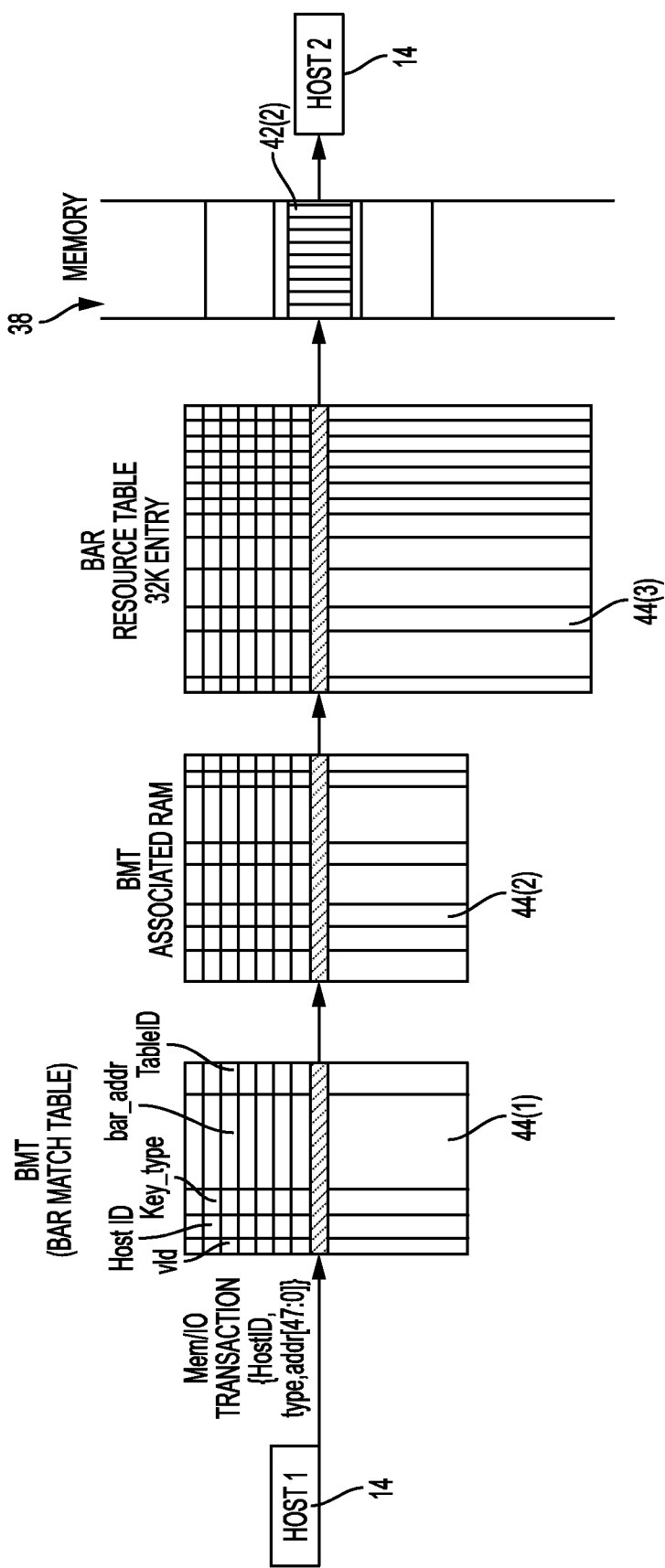
FIG. 3 is a simplified block diagram illustrating yet other example details of embodiments of the communication system.

Turning to FIG. 3, FIG. 3 is a simplified block diagram illustrating example details according to an embodiment of communication system 10. Memory and I/O requests in IO adapter 18 are handled using remap window helper register 44 comprising three cascaded hardware tables: BAR Match Table (BMT) 44(1), BMT associated random access memory (RAM) 44(2), and BAR Resource Table (BRT) 44(3). These tables attempt to resolve memory and I/O transactions to a IO adapter memory address in memory element 38 without involving any processor of IO adapter 18 or operating system of compute nodes 14. BMT 44(1) provides a mechanism to determine whether a memory request (e.g., transaction) received from Host1 matches a valid PCIE device, such as Host2. BMT 44(1) uses a search key comprising (among other parameters) a host ID and a BAR address, including length and offset. A hit in BMT 44(1) outputs a Hit Index, which indexes into an associated RAM entry in table 44(2). BRT 44(3) provides a mechanism to flexibly map a single BAR to one or more possibly non-contiguous, adapter memory-mapped resources. In some embodiments, BRT 44(3) comprises a logical table implemented in the hardware RAM of IO adapter 18.

Firmware 46 of IO adapter 18 presents a virtualized view of PCIE endpoints' configuration space to compute nodes 14. When Host1 configures memory/IO bar window(s) in the VNIC's configuration space, Host1's BAR address windows are translated by remap window helper register 44 to map them to the local root complex endpoint's BAR windows in IO adapter's local address space. For example, memory region 56(2) of Host1 is mapped to remap window region 42(2) of Host2 in memory element 38. After enumeration and virtualization of the configuration space of the PCIE endpoints, the device drivers running on compute nodes 14 may post work requests using their assigned memory bar windows.

During operation, a memory request from Host1 to allow access to a specific memory region 56(1) by a remote PCIE endpoint, say Host2 may proceed as follows. Host1 sends a memory request to firmware 46, including HostID=identifier of remote peer, say Host2; type=remote_memory_access; address=address of local memory 56(1). The memory request is converted into a search key to BMT 44(1), triggering a lookup (e.g., ternary content-addressable memory (TCAM)) of BMT 44(1), which outputs a hit index to RAM 44(2) that activates a read of appropriate entry in BRT 44(3). In some embodiments, the memory request from Host1 may reference a VNIC number, which may be converted into the corresponding host identifier by suitable modules. Firmware 46 programs the appropriate entry in BRT 44(3) to point to the provided address 56(1) of Host1. The specific memory region of the appropriate entry in BRT 44(3) is already pre-mapped to BAR2 of Host2 as remap window 42(2). In other words, the entry in BRT 44(3) references remap window region 42(2), which now directly points to memory space 56(1) of Host1 after configuration by firmware 46. Any memory requests going through remap window region 42(1) will be tagged with the VNIC of the destination compute node 14. Any writes by Host1 into local memory region 56(1) can be directly accessed by Host2 through its mapped remap window region 42(2) without any intervention by operating systems or CPUs.

Figure 4:
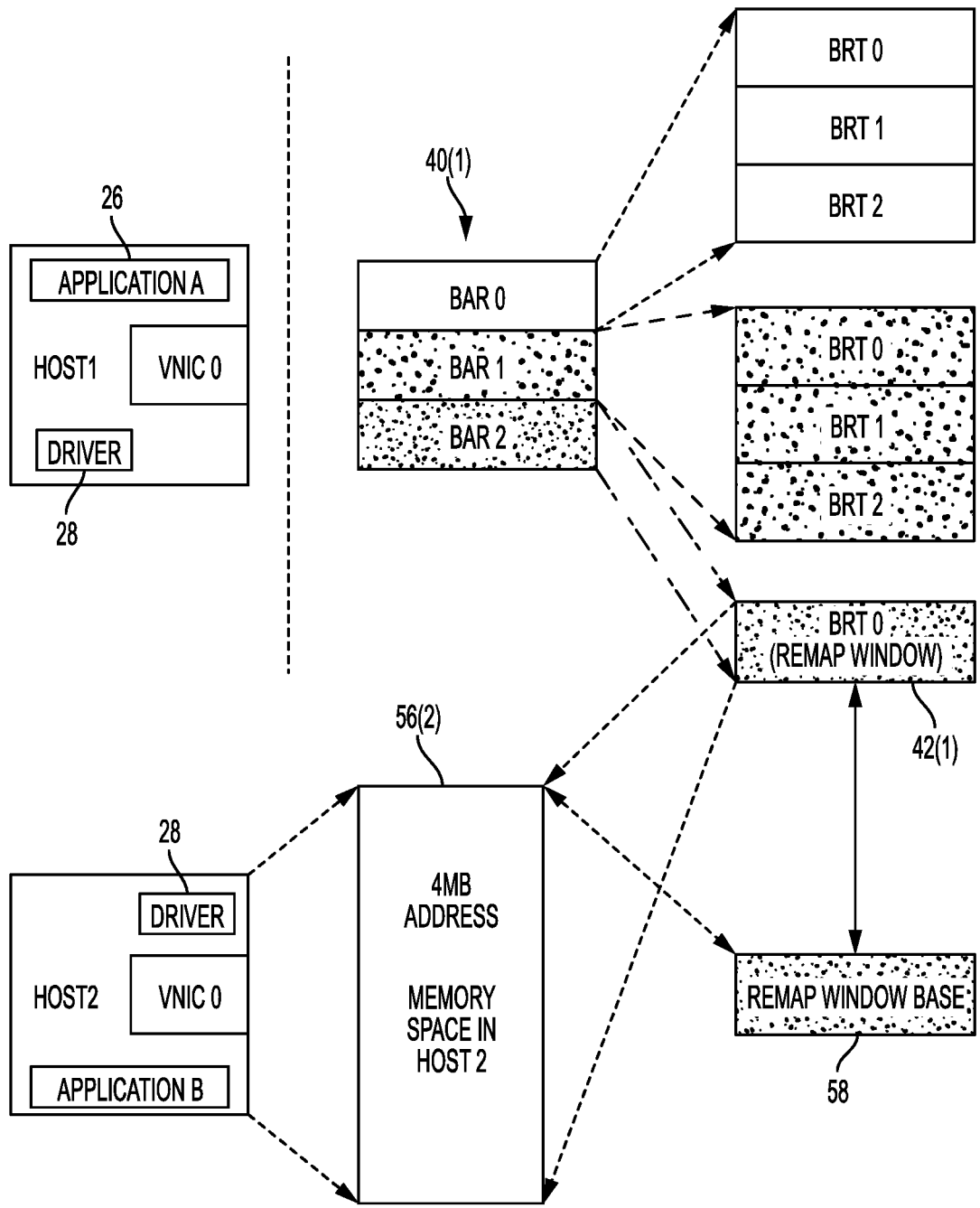
FIG. 4 is a simplified block diagram illustrating yet other example details of embodiments of the communication system.

Turning to FIG. 4, FIG. 4 is a simplified block diagram illustrating example details according to an embodiment of communication system 10. Assume that application A in Host1 and application B in Host2 exchanges data according to mechanisms as described herein. Application B takes the following actions: Application B sends a memory mapped address (e.g., IOMMU mapped address) of memory space 56(2) to driver 28 in Host2 requesting access to the PCIE endpoint corresponding to Host1. Driver 28 triggers firmware 46 in IO adapter 18 to configure a remap window base 58 in BRT 44(3) with the memory mapped address and associate it with the destination VNIC of Host1 as identified through a predetermined protocol.

Firmware 46 configures remap window base 58 with the given address and sets up application specific integrated circuit (ASIC) data structures to be ready for remap window region access. Firmware 46 discovers the destination VNIC of Host1 that wants to access the memory region as given by driver 28. Firmware 46 configures BRT0, corresponding to BAR2 of the destination VNIC Host1, with the remap window region address and offset that would correspond to the remap window base 58. Configured BRT0 corresponds to remap window 42(1) and points to memory region 56(2) of Host2.

After remap window region 42(1) is configured on behalf of the destination VNIC, firmware 46 sends notification to driver 28 running in Host1 that its BAR2 is ready to access the Host2 memory. Upon receiving the notification from firmware 46, driver 28 running in Host1 passes the notification to application A. Application A already has memory mapped the BAR2 region with appropriate IOMMU configuration (e.g., addresses). Subsequently application A's read/write access to BAR2 of Host1 maps to remote memory region 56(2) present in Host2's memory domain. Likewise, application B's read/write access to memory region 56(2) maps to BAR2 of Host1. Thus both application A and application B running in different compute nodes 14 can communicate with each other without any OS intervention.

Figure 5:
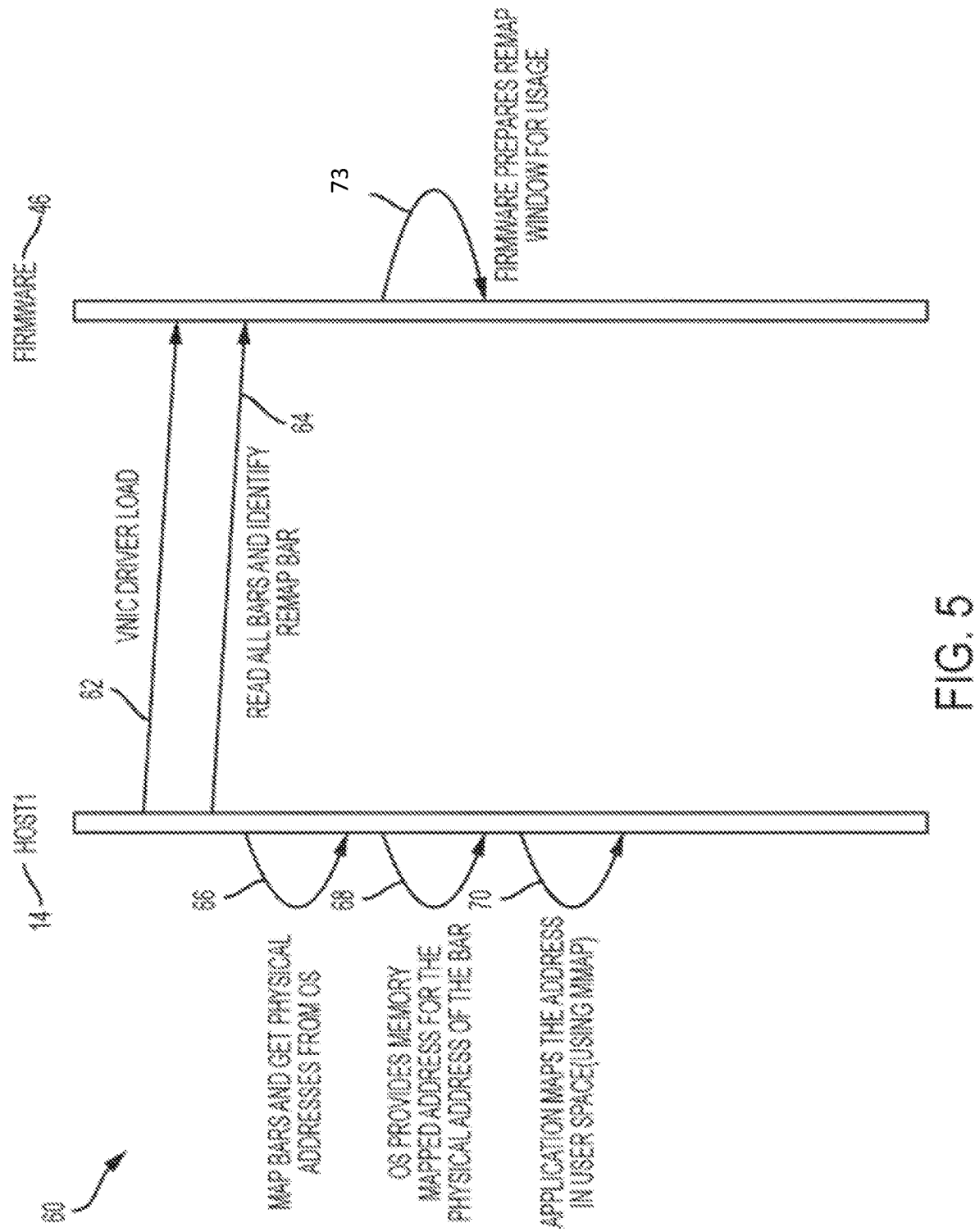
FIG. 5 is a simplified sequence diagram illustrating example operations that may be associated with an embodiment of the communication system.

Turning to FIG. 5, FIG. 5 is a simplified sequence diagram illustrating example operations 60 according to an embodiment of communication system 10 associated with a driver load scenario and discovery of various resources presented to driver 28 including remap window 42 mapped in BAR 40. At 62, driver 28 corresponding to VNIC0 of one of compute nodes 14, say Host1, is loaded. At 64, driver 28 reads BAR 40 and identifies BAR2 as the remap BAR. At 66, driver 28 maps the BARs and gets physical addresses from OS 24. At 68, OS 24 provides memory mapped address for the physical address of the BAR. At 70, application 26 maps the address in user space (e.g., using MMAP). At 73, firmware 46 prepares remap window 42 for usage by driver 28.

Figure 6:
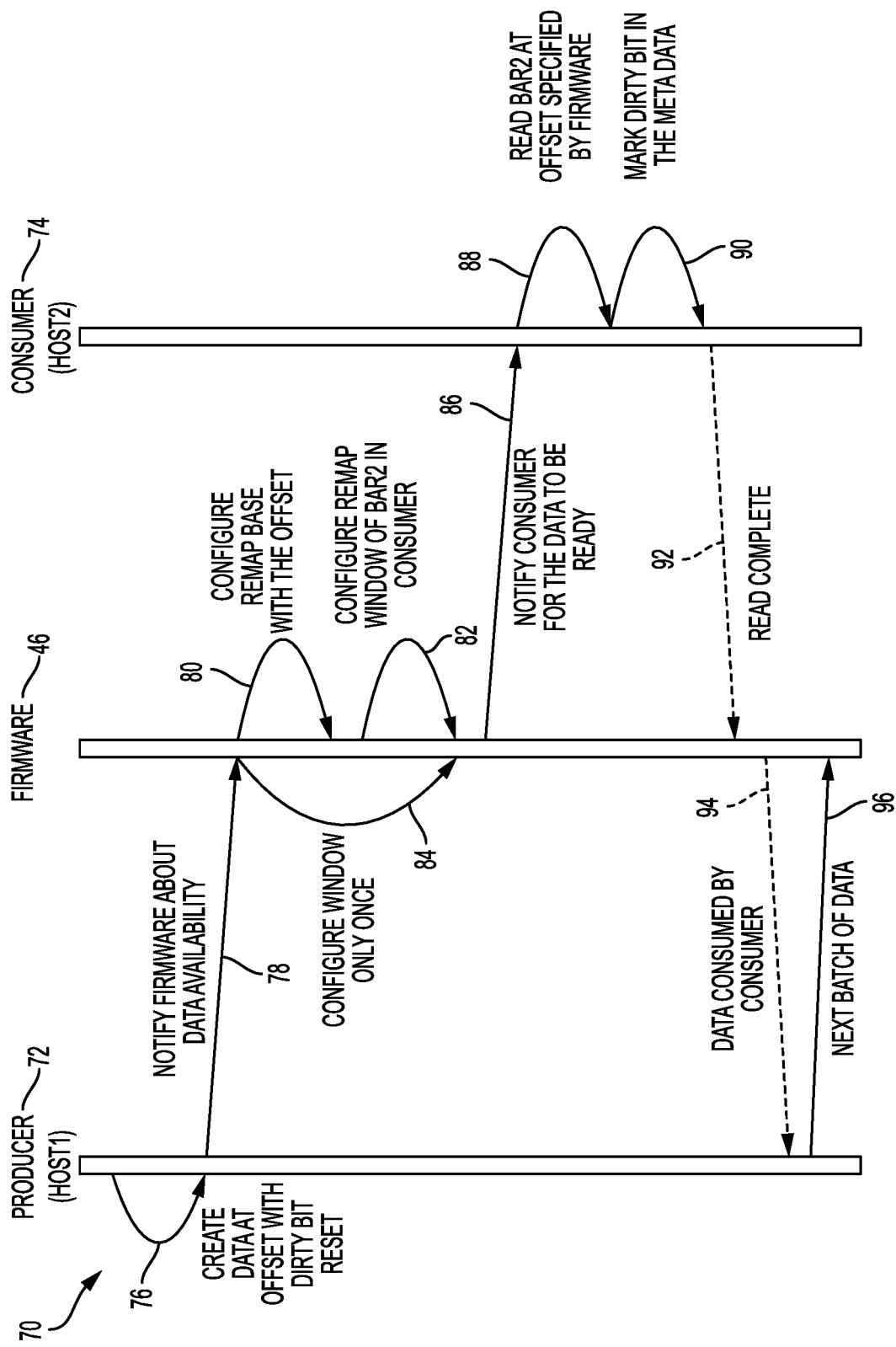
FIG. 6 is a simplified sequence diagram illustrating other example operations that may be associated with an embodiment of the communication system.

Turning to FIG. 6, FIG. 6 is a simplified sequence diagram illustrating example operations 70 according to an embodiment of communication system 10 between applications 26 running on two different compute nodes 14 and firmware 46 to enable the remap window configuration for the purpose of accessing remote memory. Assume, merely for example purposes and not as a limitation that Host1 includes application 26, which produces data, and is referred to as producer 72; Host2 includes another application 26, which consumes the data, and is referred to as consumer 74.

IO adapter 18 includes a resource map providing resource information, for example, its memory offset and length, associated with the corresponding VNIC. In some embodiments, the resource map associates memory address offsets (also referred to herein as "memory offsets," or simply "offsets") with the BAR of one or more I/O resources (the I/O resource corresponding to a PCIE device, such as VNIC). For example, the resource map may include information identifying each PCIE device on PCIE bus 22 and its corresponding BARs. In many embodiments, the resource map may be comprised in remap window help register 44. In various embodiments, BAR0 of each PCIE endpoint may point to the resource map stored in IO adapter 18. The PCIE endpoints may be identified using host indices, or other suitable identifiers. On parsing the resource map, device driver 28 in producer 72 identifies other compute nodes 14 present in chassis 12. Consumer 74 notifies firmware 46 of its intent to read the contents of the memory of Host1 through a resource update. Firmware 46 decodes the request, identifies the source and destination VNICs and sends notification to the VNIC whose associated memory is to be read.

At 76, producer 72 creates data at memory offset with dirty bit reset. (Note that the dirty bit is well known in the art to be associated with a block of memory and indicates whether or not the corresponding block of memory has been modified; if the bit is set (or reset), the data has been modified since the last time it was read). At 78, device driver 28 in Host1 notifies firmware 46 about the data availability. The notification's meta-data includes the address to be read from at its local memory space 56(1) including: address, length, destination host index of consumer and a key. At 80, firmware 46 configures remap window base 58 with the memory offset. At 82, firmware 46 configures remap window region 42(2) of BAR2 associated with Host2 to point to memory space 56(1) of Host1. At 84, firmware 46 configures remap window 42(2) only once (e.g., for all transactions between producer 72 and same consumer 74).

At 86, firmware 46 notifies consumer 74 that the data is ready. At 88, consumer 74 reads BAR2 at the memory offset specified by firmware 46. Reading BAR2 at the memory offset is identical to accessing memory region 56(1) of producer 72. At 90, consumer 74 marks the dirty bit in the meta data, indicating that the data has been read. At 92, consumer 74 may notify firmware 46 that consumer 74 has completed reading the data. At 94, firmware 46 may notify producer 72 that data has been consumed by consumer 74. At 96, producer 72 writes the next set of data to the memory offset, and the operations resume from 76 and continue thereafter.

Figure 7:
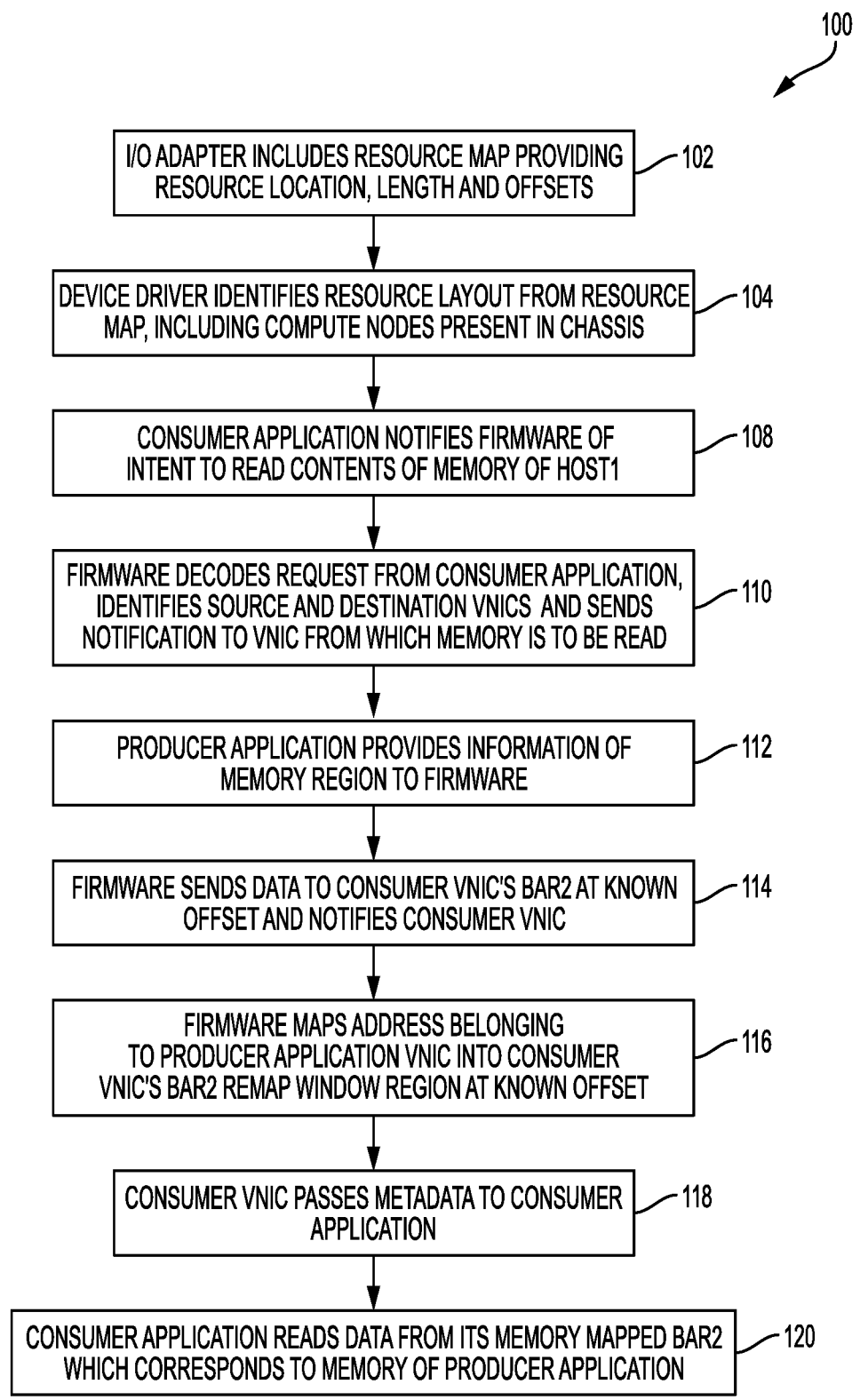
FIG. 7 is a simplified flow diagram illustrating yet other example operations that may be associated with an embodiment of the communication system.

Turning to FIG. 7, FIG. 7 is a simplified flow diagram illustrating example operations 100 according to an embodiment of communication system 10. Assume that produce 72 in Host1 is providing data to consumer 74 in Host2, both Host1 and Host2 being connected over PCIE bus 22 with IO adapter 18. At 102, IO adapter 18 includes a resource map providing resource information, such as resource location (e.g., PCIE host index), length and offsets where firmware data is present. At 104, device driver 28 in Host1 identifies the resource layout from the resource map, including other compute nodes 14 in chassis 12. In an example embodiment, identifying the resource layout comprises parsing the resource map.

At 108, consumer application 74 notifies firmware 46 of intent to read contents of memory 56(1) of Host1 through a resource update message (or other suitable mechanism). At 110, firmware 46 decodes the request, identifies the source and destination VNICs and sends notification to Host1 VNIC from which the memory is to be read. At 112, producer application 72 provides to firmware 46 the address of memory region 56(1) to be read from, through an appropriate memory request. At 114, firmware 46 sends the remap window region information (e.g., remap window base 58, remap window region 42(2)) to consumer application 74 (e.g., through associated VNIC) BAR2 at known offset and notifies the consumer VNIC.

At 116, firmware 46 maps the address belonging to the producer application VNIC, namely, address of memory region 56(1) into the consumer VNIC's BAR2 remap window region 42(2) at known offset. At 118, consumer VNIC passes the remap window information to consumer application 74. At 120, consumer application 74 reads the data from its memory mapped BAR2 which corresponds to memory 56(1) of producer application 72.

Figure 8:
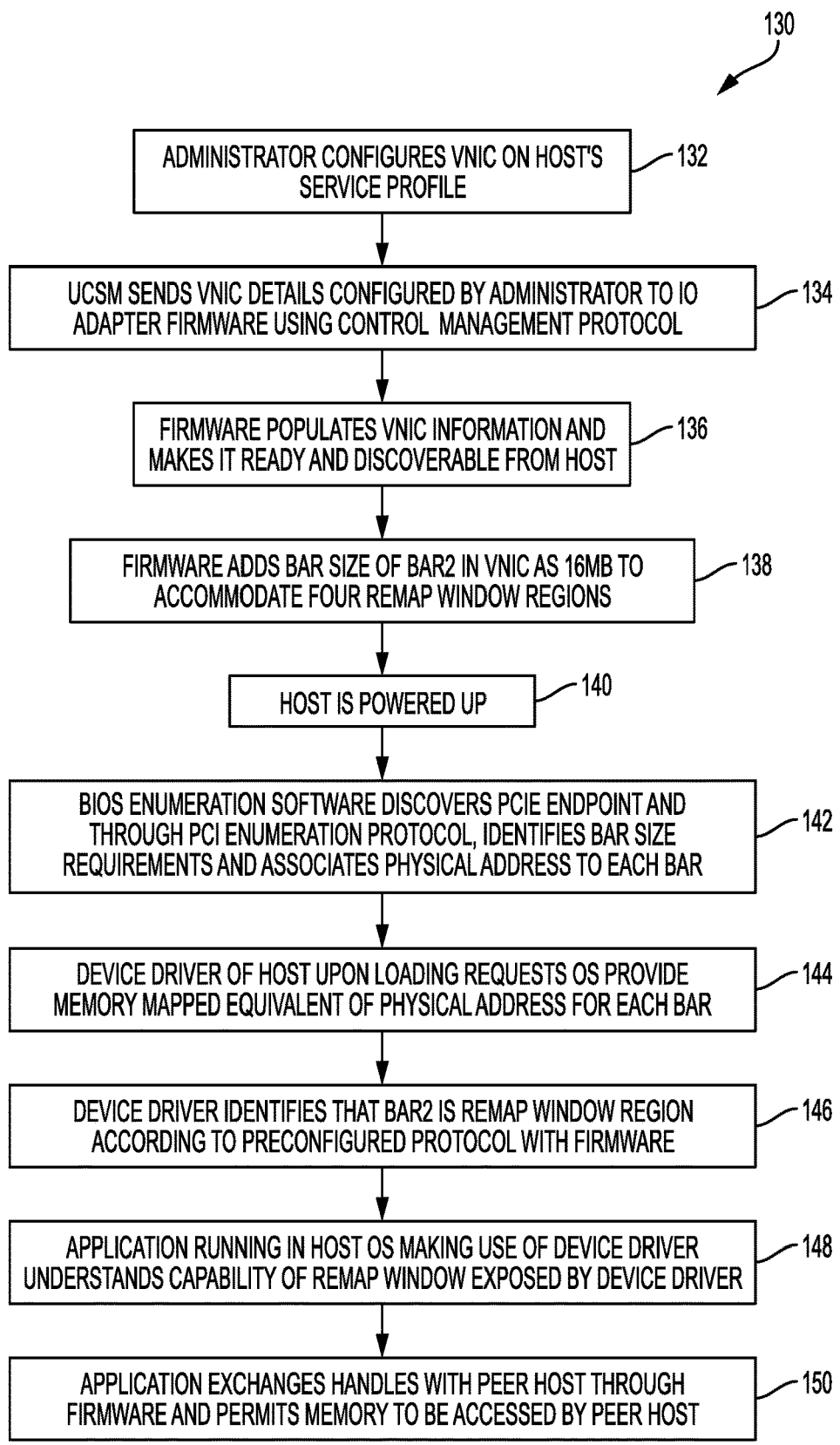
FIG. 8 is a simplified flow diagram illustrating yet other example operations that may be associated with an embodiment of the communication system.

Turning to FIG. 8, FIG. 8 is a simplified flow diagram illustrating example operations 130 according to an embodiment of communication system 10. At 132, an administrator configures VNIC on Host1's service profile. At 134, UCSM sends VNIC details configured by the administrator to IO adapter 18's firmware 46 using a suitable control management protocol. At 136, firmware 46 populates VNIC information and makes it ready and discoverable from Host1. At 138, firmware 46 adds BAR size of BAR2 in VNIC as 16 MB to accommodate four remap window regions.

At 140, Host1 is powered up. At 142, BIOS enumeration software discovers PCIE endpoint and through PCIE enumeration protocol, identifies BAR size requirements and associates physical address to each BAR. At 144, device driver 28 of Host1 upon loading, requests OS 24 to provide memory mapped equivalent of physical address for each BAR. At 146, device driver 28 identifies that BAR2 is remap window region according to preconfigured protocol with firmware 46. At 148, application 26 running in Host1's operating system 24 making use of device driver 28 understands capability of remap window exposed by device driver 28. At 150, application 26 exchanges handles with peer host (e.g., Host2) through firmware 46 and permits memory to be accessed by the peer host.

Figure 9:
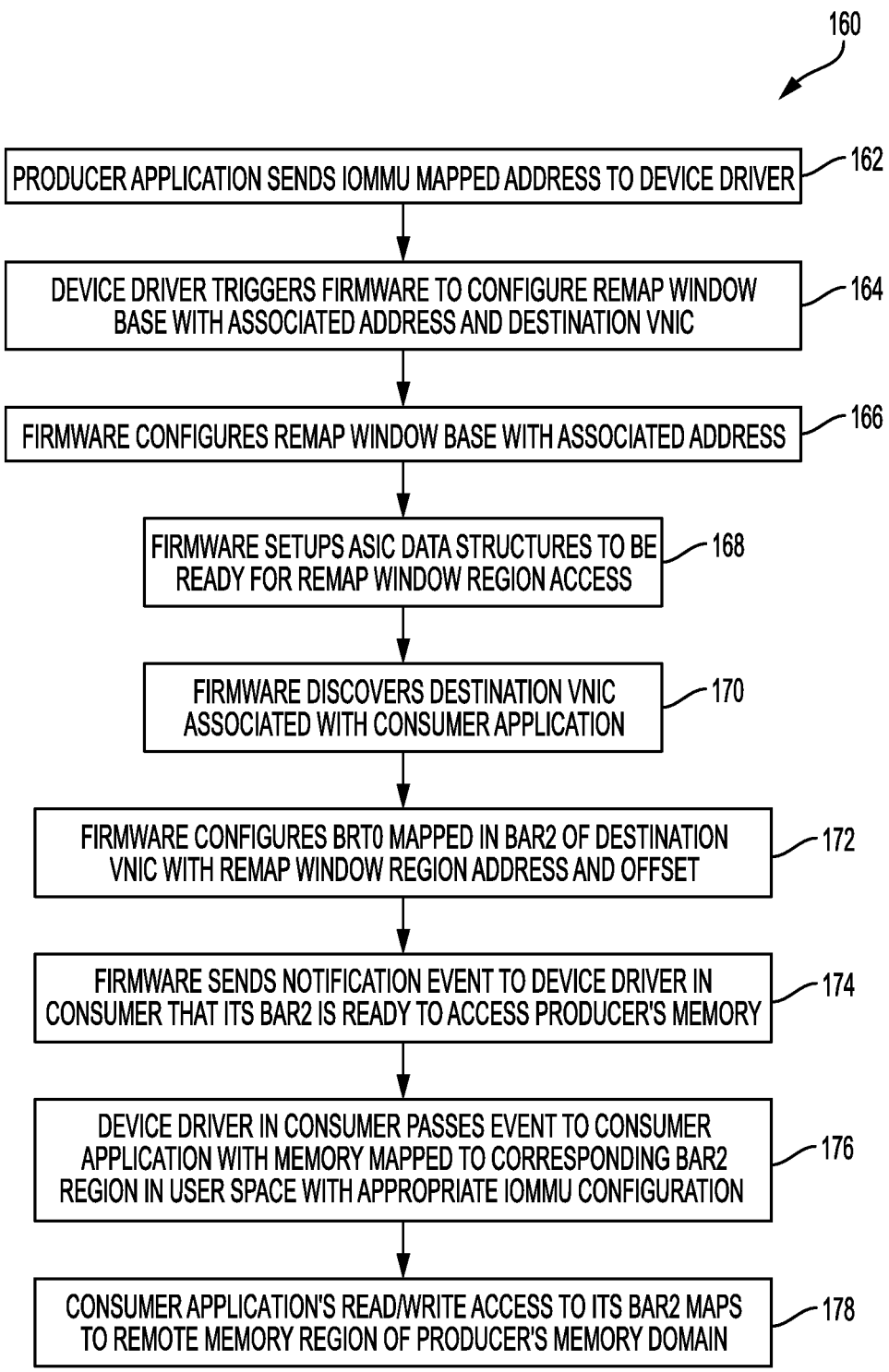
FIG. 9 is a simplified flow diagram illustrating yet other example operations that may be associated with an embodiment of the communication system.

Turning to FIG. 9, FIG. 9 is a simplified flow diagram illustrating example operations 160 according to an embodiment of communication system 10. At 162, producer application 72 (e.g., application 26 running in Host1) sends a memory request comprising a destination host (e.g., Host2) and IOMMU mapped address of memory region 56(1) to device driver 28. At 164, device driver 28 triggers firmware 46 to configure remap window base 58 with destination VNIC (e.g., corresponding to Host2) and associated address. At 166, firmware 46 configures remap window base 58 with associated address. At 168, firmware 46 sets up ASIC data structures to be ready for access to remap window region 42(2). At 170, firmware discovers destination VNIC associated with consumer application 74. At 172, firmware 46 configured BRT0 mapped in BAR2 of destination VNIC with remap window region address and offset in BRT 44(3). In other words, firmware 46 maps appropriate entry in BRT 44(3) corresponding to remap window region 42(2) to point to memory region 56(1). At 174, firmware 46 sends notification event to device driver 28 in Host2 that its BAR2 is ready to access producer's memory 56(1). At 176, device driver 28 in Host2 passes event to consumer application 74 running therein with memory mapped to corresponding BAR2 region in user space with appropriate IOMMU configuration. At 178, consumer application 72's read/write access to its BAR2 maps to remote memory region 56(2) of producer application 74's memory domain.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Embodiments described herein may be used as or to support firmware instructions executed upon some form of processing core (such as the processor of IO adapter 18) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In example implementations, at least some portions of the activities outlined herein may be implemented in software in, for example, IO adapter 18. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, IO adapter 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 38, memory element 36) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method comprising: receiving, by a firmware, from a second node a message indicating an intent to read contents of a memory region of a first node; identifying, by the firmware, a first virtualized Network Interface Cards (VNICs) for the first node and a second VNIC for the second node; sending, by the firmware, a notification to the first VNIC of the intent to read contents of a memory of a first node; receiving, by the firmware through a memory request, from the first node an address of the memory region;

sending, by the firmware, remap window region information to a Base Address Registry (BAR) field of the second node; mapping, by the firmware, the received address of the memory region of first node into the BAR field of the second VNIC; and sending, from the second VNIC to the second node, the remap window information.

2. The method of claim 1, further comprising: identifying, prior to receiving the message indicating the intent to read contents of the memory region of the first node, a resource layout from a resource map, the resource layout include at least the first and second nodes.

3. The method of claim 2, further comprising: providing, prior to the identifying the resource layout, the resource map.

4. The method of claim 1, further comprising after the third sending:
accessing, at the second node, data from a BAR field of the second node that corresponds to the memory region of the first node.

5. The method of claim 4, wherein the access is a read access.

6. The method of claim 4, wherein the access is a write access.

7. The method of claim 1, wherein the first and second compute nodes comprise microservers executing in a single chassis.

8. A non-transitory computer readable media comprising instructions which when execute by a processor cause the processor to perform operations, comprising: receiving, by a firmware, from a second node a message indicating an intent to read contents of a memory region of a first node; identifying, by the firmware, a first virtualized Network Interface Cards (VNICs) for the first node and a second VNIC for the second node; sending, by the firmware, a notification to the first VNIC of the intent to read contents of a memory of a first node; receiving, by the firmware through a memory request, from the first node an address of the memory region; sending, by the firmware, remap window region information to a Base Address Registry (BAR) field of the second node; mapping, by the firmware, the received address of the memory region of first node into the BAR field of the second VNIC; and sending, from the second VNIC to the second node, the remap window information.

9. The media of claim 8, the operations further comprising: identifying, prior to receiving the message indicating the intent to read contents of the memory region of the first node, a resource layout from a resource map, the resource layout include at least the first and second nodes.

10. The media of claim 9, the operations further comprising: providing, prior to identifying the resource layout, the resource map.

11. The media of claim 8, the operations further comprising after the third sending:
accessing, at the second node, data from a BAR field of the second node that corresponds to the memory region of the first node.

12. The media of claim 11, wherein the access is a read access.

13. The media of claim 11, wherein the access is a write access.

14. The media of claim 8, wherein the first and second compute nodes comprise microservers executing in a single chassis.

15. A system comprising: a processor; a non-transitory computer readable memory containing instructions which when executed by a processor cause the system to perform operations, comprising: receiving, by a firmware of the system, from a second node a message indicating an intent to read contents of a memory region of a first node; identifying, by the firmware, a first virtualized Network Interface Cards (VNICs) for the first node and a second VNIC for the second node; sending, by the firmware, a notification to the first VNIC of the intent to read contents of a memory of a first node; receiving, by the firmware through a memory request, from the first node an address of the memory region; sending, by the firmware, remap window region information to a BAR field of the second node; mapping, by the firmware, the received address of the memory region of first node into the BAR field of the second VNIC; and sending, from the second VNIC to the second node, the remap window information.

16. The system of claim 15, the operations further comprising: identifying, prior to receiving the message indicating the intent to read contents of the memory region of the first node, a resource layout from a resource map, the resource layout include at least the first and second nodes.

17. The system of claim 16, the operations further comprising: providing, prior to identifying resource layout, the resource map.

18. The system of claim 15, the operations further comprising after the third sending:
accessing, at the second node, data from a BAR field of the second node that corresponds to the memory region of the first node.

19. The system of claim 18, wherein the access is a read access.

20. The system of claim 18, wherein the access is a write access.

* * * * *